(12) United States Patent
Chiu

(10) Patent No.: US 7,812,890 B2
(45) Date of Patent: Oct. 12, 2010

(54) AUTO-CONFIGURATION FOR INSTRUMENT SETTING

(75) Inventor: An-Te Chiu, Taipei (TW)

(73) Assignee: Via Technologies, Inc., Taipei (TW)

( * ) Notice: Subject to any disclaimer, the term of this patent is extended or adjusted under 35 U.S.C. 154(b) by 1906 days.

(21) Appl. No.: 10/851,222

(22) Filed: May 24, 2004

(65) Prior Publication Data

US 2004/0234252 A1 Nov. 25, 2004

(51) Int. Cl.
*H04N 5/268* (2006.01)
(52) U.S. Cl. .................. 348/705; 348/554; 348/706
(58) Field of Classification Search ......... 348/552–570, 348/705, 706, 448, 446, 445
See application file for complete search history.

(56) References Cited

U.S. PATENT DOCUMENTS

| | | | |
|---|---|---|---|
| 5,565,929 A * | 10/1996 | Tanaka | 348/565 |
| 5,621,659 A * | 4/1997 | Matsumoto et al. | 710/10 |
| 5,631,850 A * | 5/1997 | Tanaka et al. | 702/122 |
| 6,131,128 A | 10/2000 | Lee | |
| 6,229,574 B1 * | 5/2001 | Han | 348/555 |
| 7,113,597 B2 * | 9/2006 | Myers | 380/201 |
| 7,113,978 B2 * | 9/2006 | Beasley et al. | 709/208 |
| 2003/0112367 A1 * | 6/2003 | Kang et al. | 348/441 |

FOREIGN PATENT DOCUMENTS

JP 10126702 A * 5/1998

* cited by examiner

*Primary Examiner*—M. Lee
(74) *Attorney, Agent, or Firm*—Stout, Uxa, Buyan & Mullins, LLP

(57) ABSTRACT

A system and method of auto-configuration for the instrument setting of a multimedia apparatus is disclosed. All available output modes are used to show multimedia information to a user by means of automatically switching and setting configurations among connected terminals. The user may select one configuration having the most perfect output quality and then set the multimedia apparatus to be operated under the selected configuration and associated connected terminal. Since connecting or setting the apparatus incorrectly can be effectively avoided, a user will not wonder what is wrong or even think that the multimedia apparatus has malfunctioned.

37 Claims, 7 Drawing Sheets

AUTO-CONFIGURATION FOR INSTRUMENT SETTING

BACKGROUND OF THE INVENTION

1. Field of the Invention

The present invention generally relates to the installation and setting of an audio/video instrument, and the present invention especially relates to configurations of input/output terminal sets of audio/video instruments for users.

2. Description of the Prior Art

Nowadays functions of audio/video instruments are getting more and more complicated, and specifications of audio/video instruments are also more and more varied. To provide more compatible and variable functions for different users, audio/video instruments are always implemented with many different kinds of input/output terminal sets. These input/output terminal sets of audio/video instruments are arranged from one to many terminal sets to accommodate them to all kinds of specifications, thus the connectors of these input/output terminal sets may have different figures. Terminal sets suited with some specifications may have different connectors with different figures and transmitters may connect to receivers with different connectors when signals are transferred with the specification. When an audio/video instrument has many terminal sets, the instrument will provide a way for users to choose a terminal set to set input or output configurations. However, many users often waste their efforts in trying to install an audio/video instrument because they don't have the related knowledge and don't know how to complete the right connections and configurations. This will lead to some situations, such as wrong connections or wrong configurations with the right connections leaving the user with a limited situation in which they are unaware on how to judge the root cause of the error. Users may even misunderstand that the audio/video instrument has malfunctioned.

As shown in FIG. 1, it depicts the back panel of a DVD/Video CD player having many terminal sets, which can be defined as a S-Video terminal set, a CVBS terminal set, a Component terminal set and a Progressive terminal set. While connectors of a progressive monitor are connected to the Progressive terminal set, if the configuration is set to the Component at this time, the user will not receive a correct audio/video outputs and probably will not know what to do. At this time, if a user tries to switch the configuration, they will get the correct audio/video outputs when the configuration is switched to the Progressive.

In the prior art, referring to FIG. 2 and FIG. 3, more experienced users often find the correct configuration of an audio/video instrument by two ways. The first way of setting a configuration is as shown in FIG. 2. As shown in the connecting block 21, a user connects a terminal set of a transmitter (i.e. the DVD/Video CD player shown in FIG. 1) to a terminal set of a receiver (i.e. the progressive monitor shown in FIG. 1). Next, the user sets a configuration of an audio/video instrument (as shown in the setting block 22) and then the user checks to see whether the terminal set of the receiver can get the correct audio/video outputs or not (as shown in the checking block 23). If yes, it is correct; otherwise, if the user cannot get the correct audio/video outputs, they change to other configurations sequentially to see if they can switch to the correct configuration. If they still cannot get the correct outputs, they have to change to another connection between terminal sets and repeat aforementioned steps again. The second way of setting a configuration is as shown in FIG. 3. As shown in the connecting block 31, a user connects as many terminal sets of a transmitter as possible to terminal sets of a receiver. Next, the user sets one of the configurations of an audio/video instrument as shown in the setting block 32, and then the user checks to see whether the terminal set of the receiver can get the correct audio/video outputs or not (as shown in the checking block 33). If they cannot get the correct outputs, they have to change to another configuration and repeat the aforementioned steps until they get the correct audio/video outputs. By adopting the two ways described above, it usually makes users confused that whether a terminal (or a configuration) has been tried or not. Accordingly, sometimes it will let users lose their patience, and sometimes an installation manual of an audio/video instrument is too complicated or too simplified for users to understand.

Accordingly, it is necessary to provide a method for helping users to easily set a correct configuration. The present invention provides a system and method for auto-configuration of instrument setting for simplifying the operating steps of users and for helping users to correctly install and further find the best setting.

SUMMARY OF THE INVENTION

One main purpose of the present invention is to provide users with a simpler and more practicable method and system of auto-configuration for instrument setting.

Another purpose of the present invention is to provide a method and system of auto-configuration for instrument setting, including a mechanism of progressively switching the configuration; and it is used to select a best output mode from the various output modes for users.

The method of auto-configuration for instrument setting according to the present invention is used to electrically connect the terminals of an electrical instrument that has at least one terminal set to the terminals of another electrical instrument. Next, starting the auto-configuration for an instrument setting by the external means and then choosing a terminal set of an electrical instrument and setting the configuration of the chosen terminal set of the electrical instrument every period of time. Thus, it can make electrical signals be transmitted between the two electrical instruments. In the following, the system of auto-configuration for instrument setting repeatedly chooses a terminal set of an electrical instrument and switching the configurations of the chosen terminal set of the electrical instrument until the system is stopped by the users. In the preferred embodiment of the present invention, which terminal sets will be chosen can be limited in only the terminal sets that have been connected. Besides, the configuration of the chosen terminal set of the electrical instrument can be stored and the configuration will be started at the next chosen terminal set when the system is started next time.

The system of auto-configuration for instrument setting according to the preferred embodiment of the present invention includes at least one terminal set, configured for electrically connecting a first electrical instrument to a second electrical instrument; a starting switch, configured for sending out a starting control signal to the first electrical instrument according to a control signal source; a stopping switch, configured for sending out a stopping control signal to the first electrical instrument according to the control signal source; a choosing means, configured for repeatedly choosing one of the terminal sets every preset period of time after receiving the starting control signal; and a multiplexer, configured for setting the configuration of the chosen terminal set and transmitting electrical signals between the first electrical instrument and the second electrical instrument through the chosen terminal set.

The present invention has many advantages over the prior art, in this regard, guiding users for configurations and setting of the terminal sets by the means of the above-mentioned system and method. Even though the user doesn't understand the audio/video instruments, being afraid that the audio/video instruments will malfunction or are limited in the complicated procedures, thus resulting in a failure to connect to the correct terminal sets and to set correct configuration of these instruments. Thereby the best audio/video output for the users is found.

The features and advantages of the invention will be described as follows and be included in the claims.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will be described exquisitely below. Besides, the invention can also be practiced extensively in other embodiments. That is to say, the scope of the invention should not be restricted by the proposed embodiments. The scope of the invention should be based on the claims proposed later.

And then, the components of the different elements are not shown to scale. Some dimensions of the related components are exaggerated and meaningless portions are not drawn to provide a more clear description and comprehension of the present invention.

Besides, in the present disclosure, the words "a" or "an" are to be taken to include both the singular and the plural. Conversely, any reference to plural items shall, where appropriate, include the singular.

Figure 1:
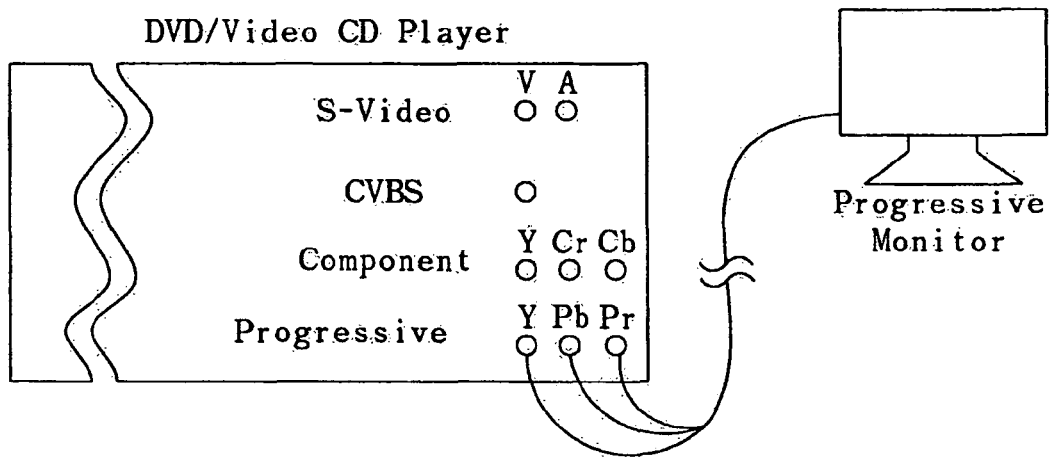
FIG. 1 is a schematic example of the prior art.
Figure 2:
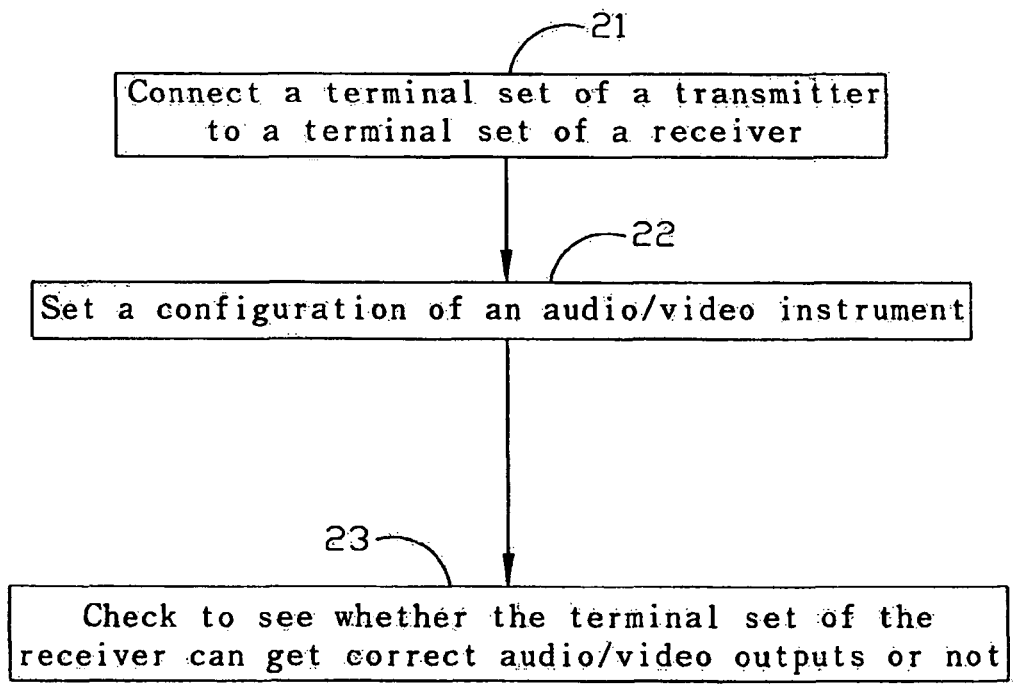
FIG. 2 is one illustrative chart of the prior art.
Figure 3:
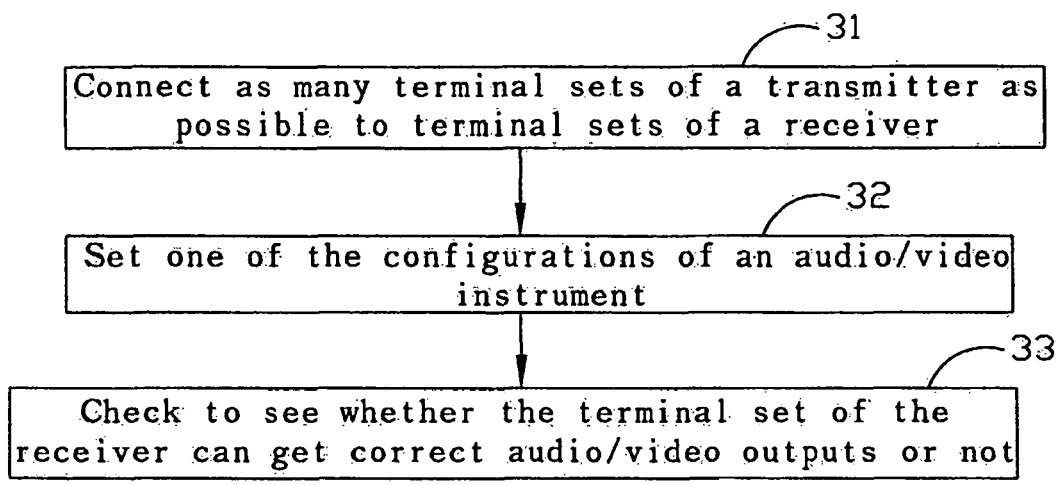
FIG. 3 is the other illustrative chart of the prior art.
Figure 4A:
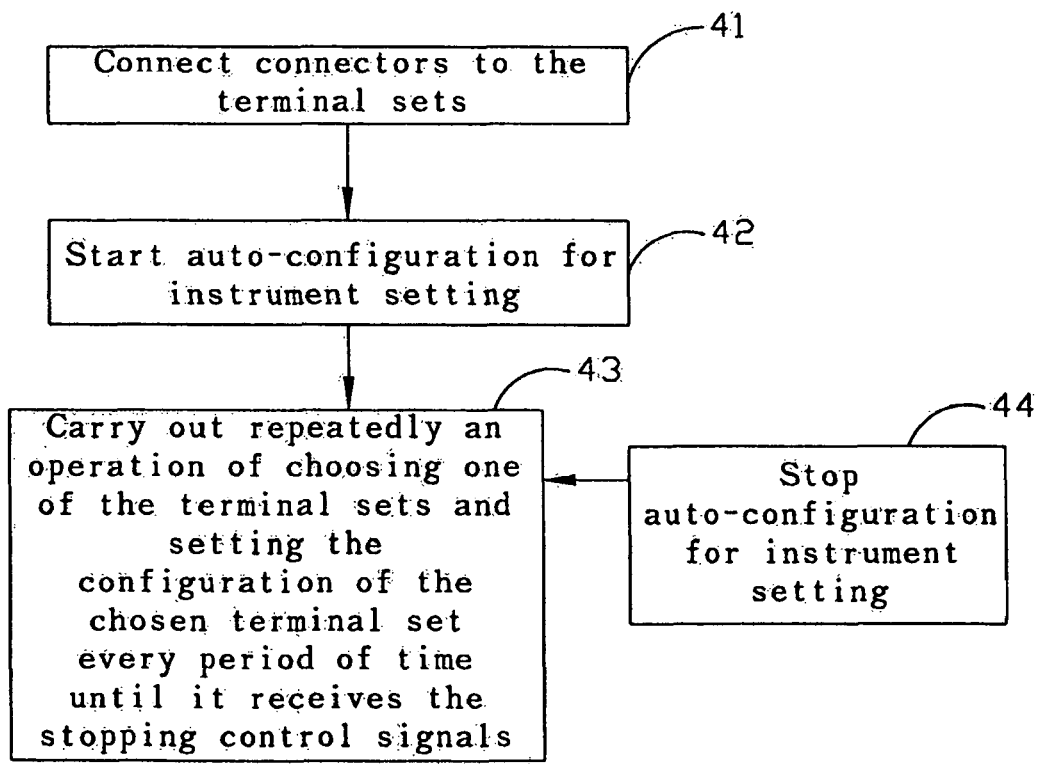
FIG. 4A to FIG. 4C schematically show illustrative charts of one preferred embodiment of the present invention.

One preferred embodiment of the present invention is a method of auto-configuration for instrument setting as shown in FIG. 4A and the method at least comprises the following basic steps.

Users connect connectors to the terminal sets as shown in the connecting block 41, and one terminal set or all possible terminal sets can be connected. The main purpose here lies in establishing the connection between a transmitter and a receiver. The connection not only includes connecting between input terminals and output terminals by connectors, but also includes connecting by wireless methods, which can be achieved by infrared rays or Bluetooth technology.

Users start auto-configuration for instrument setting as shown in the starting block 42, and the method of starting auto-configuration lies in triggering a source of starting control signals for generating a starting control signal. As regards the triggering method, it can be pushing a start button implemented on an audio/video instrument by users, using a remote-control means, and commanding with voices. The present embodiment will not limit these details of how to practice the starting way.

When receiving the starting control signals, as shown in the choosing block 43, upon repeatedly carrying out an operation of choosing one of the terminal sets and setting the configuration of the chosen terminal set every period of time (for instance, every 5 or 10 seconds) until it receives the stopping control signals. When setting the configuration of a terminal set, the audio/video instrument will send electrical signals through the terminal set to the display means. The basic principle of choosing a terminal set lies in non-repeatedly choosing a terminal set with a sequence, i.e. a terminal set with related configuration is selected for displaying one time under the sequence. After choosing all of the terminal sets, the step for choosing will start from the first terminal set of the sequence again. Besides, the aforementioned electrical signals include the following signals: audio signals, video signals, control signals, information signals and the combination of the above-mentioned signals.

Users stop auto-configuration for instrument setting as shown in the stopping block 44, the way of stopping control signals can be achieved by triggering a source of stopping control signals (it can be similar to the way shown in the starting block 42) such as pushing down a starting button implemented on an audio/video instrument, using a remote-control means, or commanding with voices. The present embodiment will not limit these details of how to practice the starting way. Herein, users can trigger the source of stopping control signals when they see the correct images or hear the correct voices, i.e. users may receive audio/video information displayed by the audio/video instrument via the display and speakers. Users can also trigger the source of stopping the control signals when they see the best images or hear the best voices. In addition, the way of stopping control signals can also be produced automatically and it can be stopped after a preset number of times of choosing the terminal sets. Further, the preset number of times can be a specific number of times (one time or a plurality of times) for choosing the terminal sets; it also can be the total amount of terminal sets, multiples of the total amount of terminal sets to choose each of terminal sets one or many times.

Next, referring to FIG. 4A, when users connect a cable line between a multimedia apparatus and a display means (i.e. the operation mentioned as the block 41), they can transmit the starting control signal to the multimedia apparatus (i.e. the operation mentioned as the block 42) by pressing a button for starting the auto-configuration of a remote control. Then, the multimedia apparatus will choose the first terminal set as the configuration to play the multimedia information on the display means. After playing the multimedia information 5-10 seconds for users, the multimedia apparatus switches to the next terminal set and then sets the configuration according to the terminal set, and the multimedia apparatus outputs the multimedia information for users according to the configuration afterwards (i.e. the operation mentioned as the block 43). At the end the operation of auto-switching and configuration will stop after a preset number of times of choosing the terminal sets if the button for stopping configuration is never pressed. Users can press the button to stop the configuration on the remote control whenever they observe the correct multimedia information, and the multimedia apparatus will perform the operation of configuration according to the current configuration (i.e. the operation mentioned as the block 44). Of course, users can decide one of the terminal sets after observing all of the multimedia quality played depending on each terminal set. For example, observing after switching all terminal sets, users can choose the one with the best playing quality and set the configuration when the multimedia apparatus is switched on the next time.

Figure 4B:
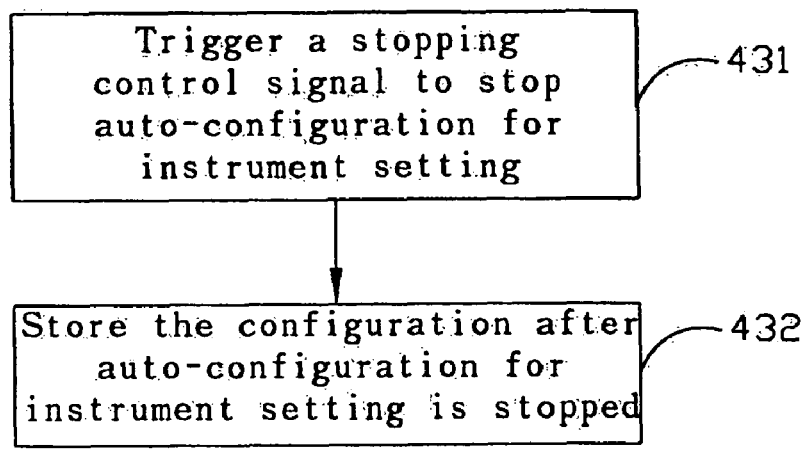
Figure 4C:
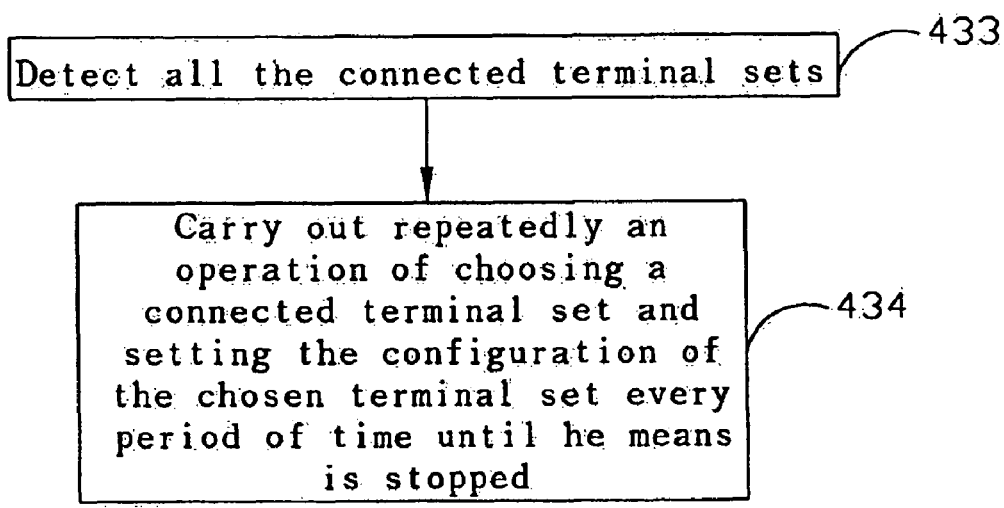

Users trigger a stopping control signal to stop the auto-configuration for the instrument setting as shown in the stopping block 431 of FIG. 4B. For the convenience of using the means of the auto-configuration for the instrument setting, the means of auto-configuration for the instrument setting can store the configuration at this time after the users trigger the stopping control signals as shown in the storing block 432. Next time the users can start the auto-configuration for instrument setting from the next configuration of a stored configuration at this time. That is, the stored configuration is set as the last terminal set before stopping. For seeking for better choice, the multimedia apparatus can switch to the next terminal set when the starting control signal is triggered again. Thus it can prevent users from considering the first terminal set that users can watch or listen to the multimedia information playing as the only choice because the users start from the first terminal every time.

In order to accelerate the process of choosing a terminal set, the scope of the chosen terminal sets can be limited in the scope of terminal sets to which have been connected and this can save the time spent on unconnected be further modified as the following. First, as shown in the detecting block 433, a means of the auto-configuration for instrument setting detects all the connected terminal sets. Then, as shown in the choosing block 434, the means repeatedly carries out an operation of choosing a connected terminal set and setting the configuration of the chosen terminal set every period of time until the means is stopped. Herein it should be emphasized that, the basic principle of choosing a terminal set lies in non-repeatedly and sequentially choosing a connected terminal set from those terminals that have been detected by the means. After choosing all of the connected terminal sets, the choosing will start from the first terminal set of the sequence again. In addition, the way of stopping control signals can also be produced automatically and the choosing can be stopped after a preset number of times of choosing the connected terminal sets. Herein the preset number of times can be a specific number of times (one time or a plurality of times) for choosing the terminal sets; it can also be the total amount of terminal sets and multiples of the total amount of terminal sets to choose each of terminal sets one or many times. As shown in the stopping block 431 of FIG. 4B, for the convenience of using the means of the auto-configuration for instrument setting, the means of auto-configuration for instrument setting can store the configuration at this time after the users trigger the stopping control signals as shown in the storing block 432. Next time the users can start the auto-configuration for instrument setting from the next configuration of the stored configuration that is stored at this time. That is, the stored configuration is set as the last terminal set before stopping. For seeking for better choice, the multimedia apparatus can switch to the next terminal set when the starting control signal is triggered again. Thus, it can avoid the users considering the first terminal set as the only choice because of starting from the first terminal every time.

For example, when users connect a multimedia apparatus and a display means with the terminal sets of a component signal and progressive signal (i.e. the operation mentioned as the block 41), they can transmit the starting control signal to the multimedia apparatus by pressing a button for starting auto-configuration of a remote control (i.e. the operation mentioned as the block 42). Then, the multimedia apparatus will choose the first connected terminal set (it is the terminal set of component signal at this time) as the configuration to play the multimedia information on the display means. After playing the multimedia information 5-10 seconds for users, the multimedia apparatus switches to the next terminal set (it is the terminal set of progressive signal at this time) and set the configuration according to it, and the multimedia apparatus output the multimedia information for users according to the configuration afterwards (i.e. the operation mentioned as the block 43). At the end the operation of auto-switching and configuration will stop after the preset number of times of choosing the terminal sets if the button for stopping configuration is never pressed. Users can press the button to stop the configuration of the remote control whenever they observe the correct multimedia information, and the multimedia apparatus will perform the operation of configuration according to the current configuration (i.e. the operation mentioned as the block 44). Of course, users can decide one of the terminal sets after observing all of the multimedia quality played depending on each terminal set. For example, observing after switching all terminal sets, users can choose the one with the best playing quality and set the configuration when the multimedia apparatus is switched on the next time.

Figure 5A:
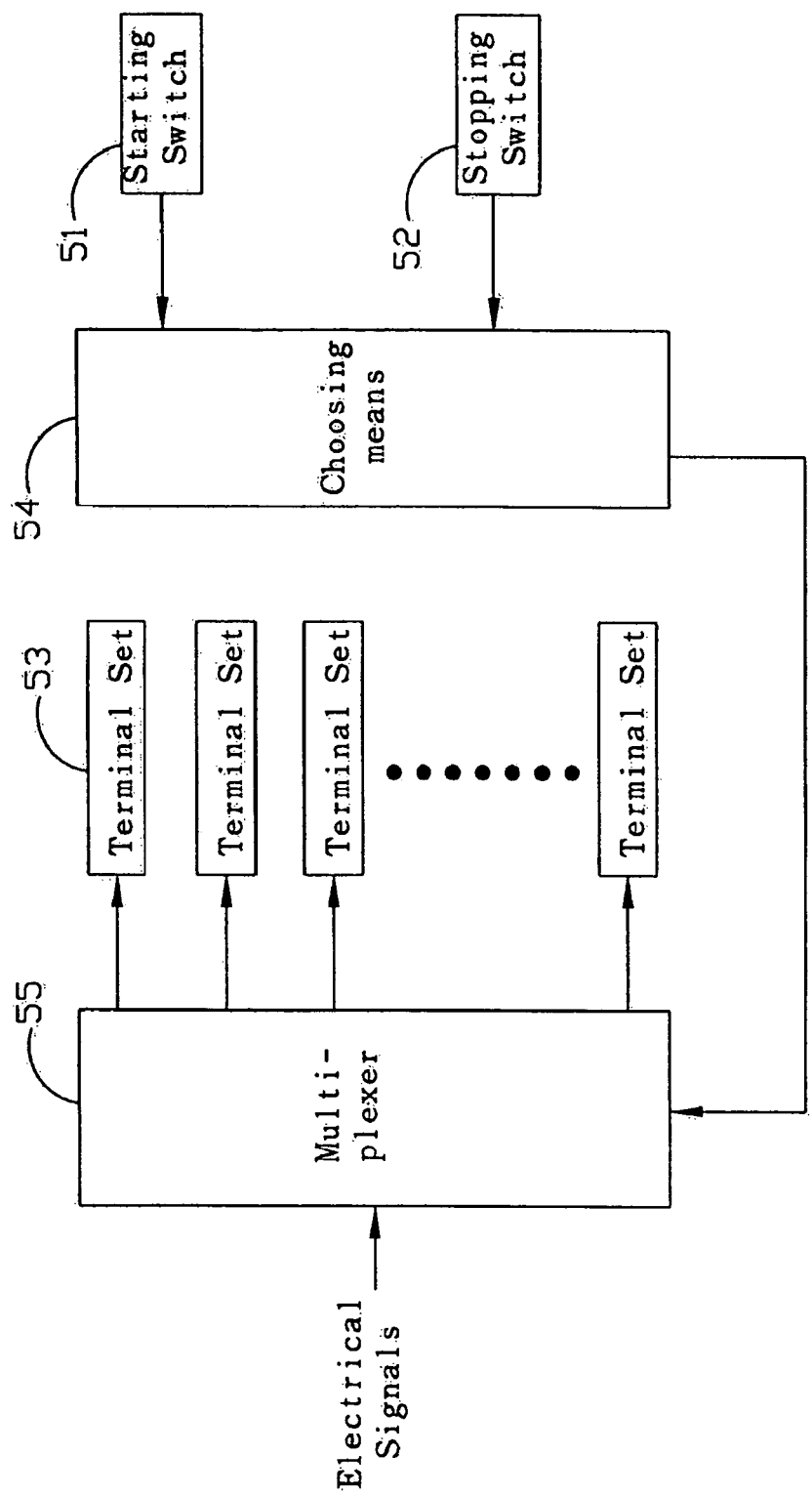
FIG. 5A to FIG. 5D schematically show illustrative charts of the other preferred embodiment of the present invention.

Another preferred embodiment of the present invention is a system of auto-configuration for instrument setting as shown in FIG. 5A, including the means: a starting switch 51 which is a source of control signals used to start control signals; a stopping switch 52 which is a source of control signals used to stop control signals, wherein the starting switch and the stopping switch are the parts for receiving external triggers for starting or stopping the whole system of the multimedia apparatus (it can be a button, a Bluetooth means, a infrared rays means and a speech sounds means, which is not restricted herein); a plurality of terminal sets 53 used to connect other external electrical instruments; a choosing means 54 used to sequentially choose a terminal set from these terminal sets every preset period of time after receiving starting control signals and then send out the chosen result. Herein the choosing operation will be stopped after receiving a stopping control signal, and a multiplexer 55 is used to transmit electrical signals between two electrical instruments by the chosen result.

When setting the configuration of a terminal set and an audio/video instrument is a receiver, it will receive electrical signals from a transmitter through the terminal set. And if an audio/video instrument is a transmitter, it will send out electrical signals with the terminal set.

In addition, the starting switch and the stopping switch can be integrated in a control means. For example, the control means can be a double-stated switch and when the double-stated switch is switched to "On", it will send out a starting control signal. On the other hand, when the double-stated switch is switched to "Off", it will send out a stopping control signal. Besides, since the embodiment will not limit the forms of switches, the control means can also be integrated to the starting switch and the stopping switch described above.

Figure 5B:
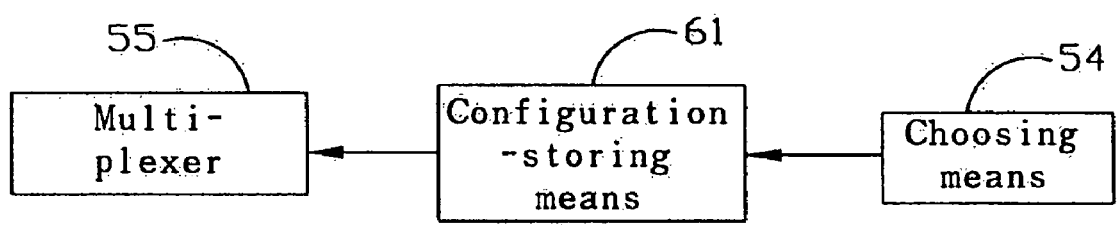

As shown in FIG. 5B, for the convenience of using the means of the auto-configuration for instrument setting, the means of auto-configuration for instrument setting can be implemented with a configuration-storing means 61 to store the chosen result sent out by the choosing means 54. And next time users can start the auto-configuration for instrument setting to choose from the next configuration of the stored configuration at this time. In the meantime, the multiplexer 55 will transmit the chosen result stored by the configuration-storing means 61 with electrical signals between two electrical instruments through the chosen terminal set.

Figure 5C:
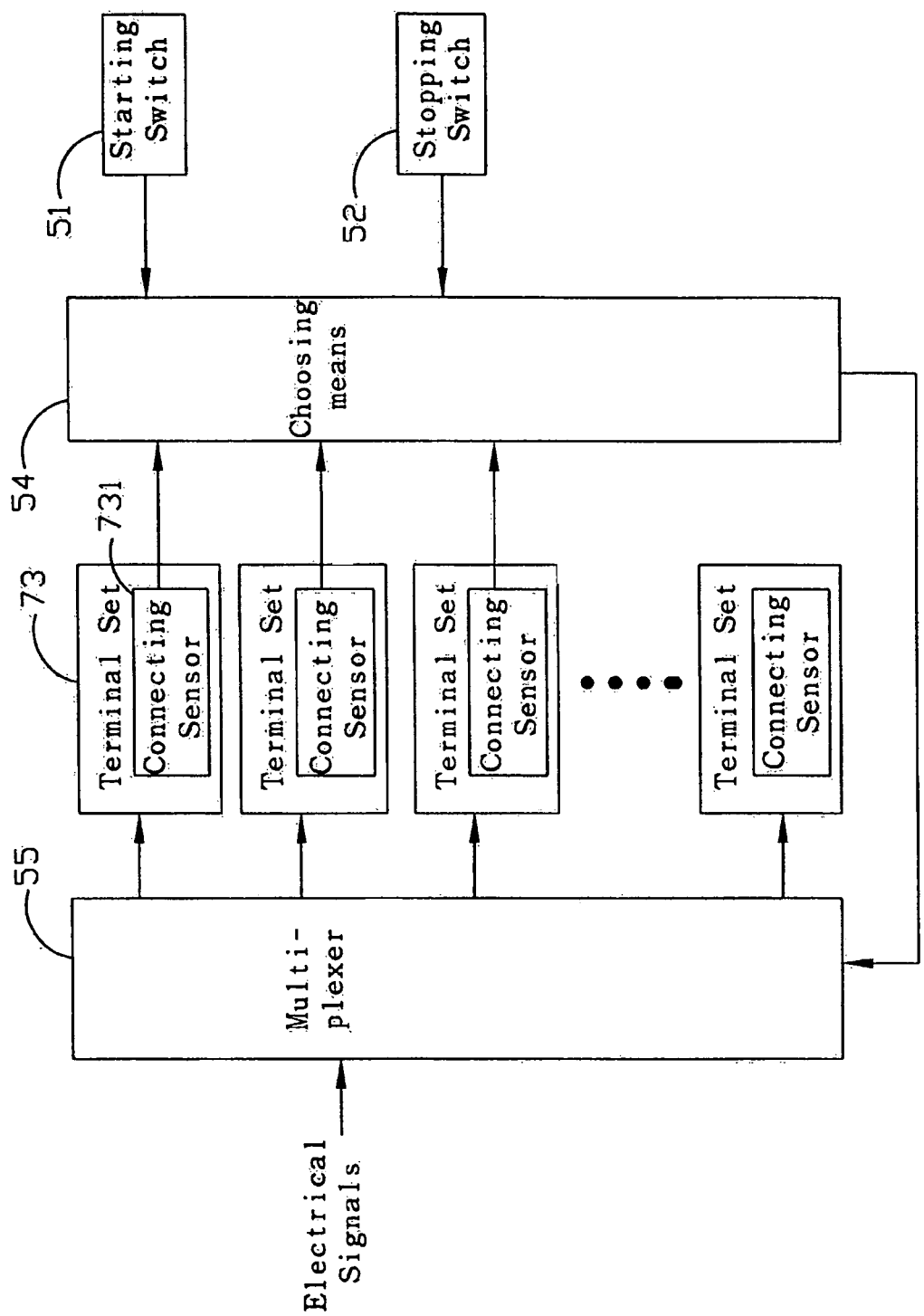

In order to accelerate the process of choosing a terminal set, the scope of chosen terminal set can be limited in the scope of terminal sets to which have been connected as shown in FIG. 5C. The goal can be achieved by adding a connecting sensor 731 to each terminal set 73, the connecting sensor 731 is used to detect all terminal sets to which have been connected and send out the result to the choosing means 54. Herein, the basic principle of choosing a terminal set lies in non-repeatedly choosing one by one connected terminal sets which have been detected by the means with a sequence. After choosing all of the connected terminal sets, the choosing will start from the first terminal set of the sequence again. Besides, the next time users can start the auto-configuration for the instrument setting from the next configuration of the stored configuration at this time. In addition, the way of stopping control signals can also be produced automatically and the choosing can be stopped after the preset number of times for choosing the connected terminal sets. Further, the preset number of times can be a specific number of times (one time or a plurality of times) for choosing the terminal sets; it also can be the total amount of terminal sets and multiples of the total amount of terminal sets to choose each of terminal sets one or many times.

Figure 5D:
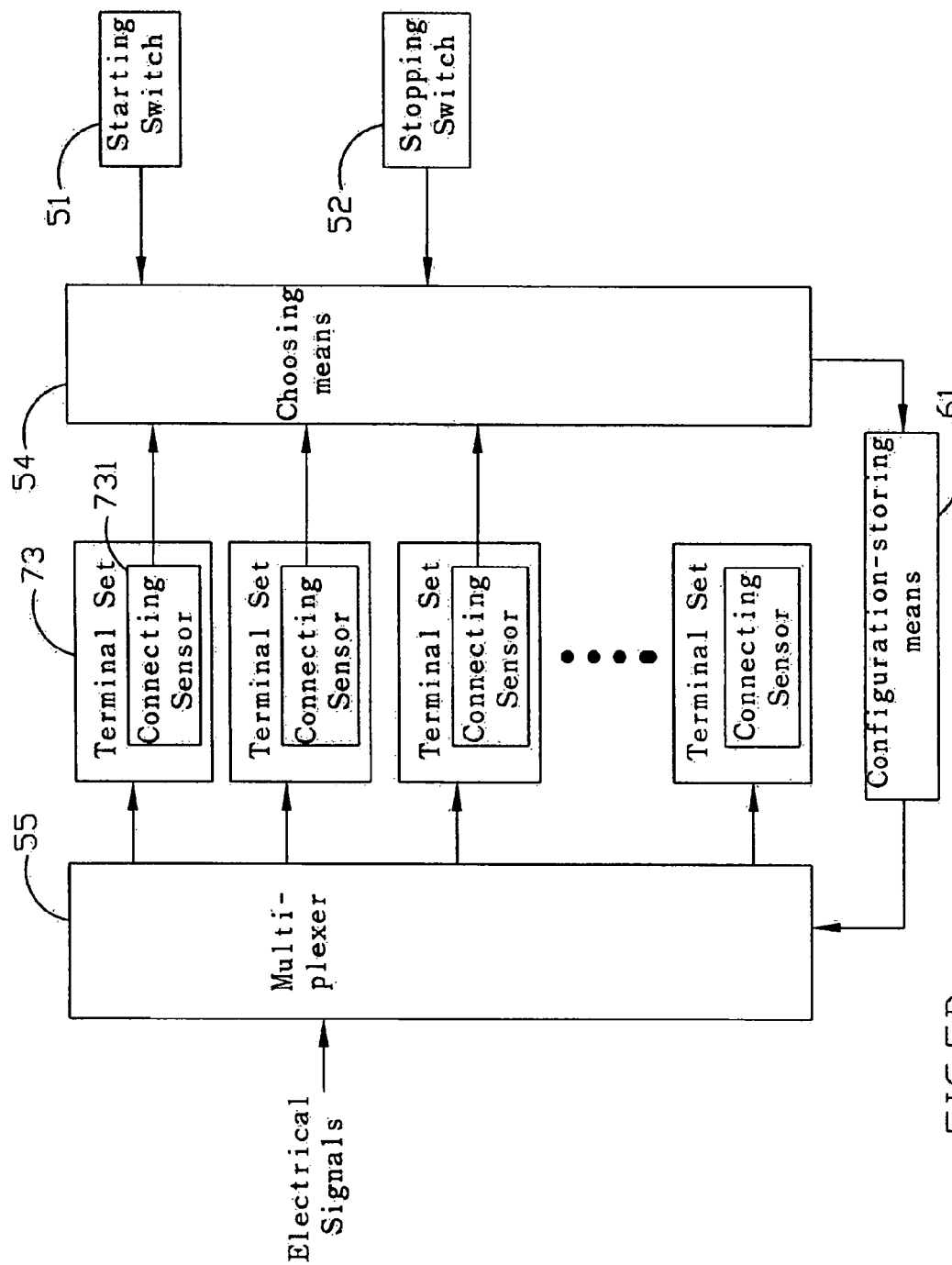

As regards FIG. 5D, it is a combined illustrative chart of FIG. 5A to FIG. 5C.

According to the embodiments of the present invention, users can connect connectors to one terminal set first and then start the auto-configuration of both a transmitter and a receiver. This will be very convenient to judge whether the connection is correct. And users can carry out each of the possible connections to find out the best output one by one. That is because that the connections between the terminals of two audio/video instruments can be of various connection methods, including correct and incorrect; thus we can get an output or multi outputs after all possible connections are tried and then choose the best connection from them. In addition, users can also make all possible connections at the same time and start the auto-configuration of both the transmitter and receiver. This will be very convenient and easy to judge incorrect connections, and providing users with the selective connections that have the best output after excluding these impossible connections and finding out other possible connections.

What is said above is only a preferred embodiment of the invention, which is not to be used to limit the claims of the invention; any change of equal effect or modifications that do not depart from the essence displayed by the invention should be limited in what is claimed in the following.

What is claimed is:

1. A method of auto-configuration for instrument setting, comprising:

starting auto-configuration for instrument setting in a first electrical instrument having a plurality of input/output terminal sets, wherein said first electrical instrument is electrically connected to a second electrical instrument by at least one terminal set of said first electrical instrument;

choosing one of said terminal sets every period of time and setting a corresponding configuration of said chosen terminal set repeatedly by the first electrical instrument, transmitting electrical signals originated from said first electrical instrument to said second electrical instrument through said chosen terminal set, and then displaying multimedia information according to said configuration in the second electrical instrument; and repeating the choosing step for another one of said terminal sets and the displaying step until a stopping control signal is sent.

2. The method of auto-configuration for instrument setting according to claim 1, wherein the step of starting said auto-configuration for instrument setting is started according to a control signal, and said control signal is generated by triggering an external signal source of said first electrical instrument.

3. The method of auto-configuration for instrument setting according to claim 1, wherein said electrical signals comprise video signals, audio signals, control signals and information signals.

4. The method of auto-configuration for instrument setting according to claim 1, wherein the choosing step is performed by non-repeatedly choosing said terminal sets one by one with a sequence.

5. The method of auto-configuration for instrument setting according to claim 4, wherein the step of choosing one of said terminal sets starts from the first terminal set again after choosing all said terminal sets.

6. The method of auto-configuration for instrument setting according to claim 1, further comprising a step of automatically stopping auto-configuration for instrument setting to automatically stop after choosing said terminal sets at a preset number of times.

7. The method of auto-configuration for instrument setting according to claim 6, further comprising a step of storing the configuration setting after automatically stopping auto-configuration for instrument setting and said terminal set next to the one of said stored configuration setting will be chosen when said auto-configuration for instrument is started next time.

8. The method of auto-configuration for instrument setting according to claim 1, further comprising a step of playing multimedia information for said chosen terminal set.

9. The method of auto-configuration for instrument setting according to claim 1, further comprising a step of automatically detecting said terminal sets which have been connected before repeatedly choosing one of said terminal sets for repeatedly choosing said connected terminal sets only.

10. The method of auto-configuration for instrument setting according to claim 1, wherein said first electrical instrument is a DVD/Video CD player and said second electrical instrument is a display apparatus.

11. A system of auto-configuration for instrument setting, comprising:

at least one terminal set for electrically connecting a first electrical instrument to a second electrical instrument, said first electrical instrument having a plurality of input/output terminal sets;

a starting switch for sending a starting control signal to said first electrical instrument according to a control signal source;

a choosing means located in the first electrical instrument for repeatedly choosing one of said terminal sets every first period of time after receiving said starting control signal; and a multiplexer located in the first electrical instrument for setting a corresponding configuration of said chosen terminal set and transmitting electrical signals originated from said first electrical instrument to said second electrical instrument through said chosen terminal set.

12. The system of auto-configuration for instrument setting according to claim 11, wherein the choosing action is performed by non-repeatedly choosing said terminal sets one by one with a sequence.

13. The system of auto-configuration for instrument setting according to claim 11, wherein said electrically connecting said first electrical instrument to said second electrical instrument is performed by means of a wired or a wireless way.

14. The system of auto-configuration for instrument setting according to claim 11, wherein said electrical signals comprise video signals, audio signals, control signals and information signals.

15. The system of auto-configuration for instrument setting according to claim 11, further comprising a stopping switch for sending a stopping control signal to said first electrical instrument according to said control signal source, wherein the choosing action will be stopped after said stopping control signal is received.

16. The system of auto-configuration for instrument setting according to claim 15, wherein said stopping control signal will be sent out after choosing said terminal sets at a preset number of times.

17. The system of auto-configuration for instrument setting according to claim 11, wherein said multiplexer will transmit said electrical signals between said first electrical instrument and said second electrical instrument through said chosen terminal set in according with said chosen terminal set chosen by said first electrical instrument.

18. The system of auto-configuration for instrument setting according to claim 11, further comprising a configuration-storing means used to store a chosen result of said chosen terminal set, and said configuration will be started at next one to said chosen terminal set when said auto-configuration for instrument setting is started next time.

19. The system of auto-configuration for instrument setting according to claim 11, wherein each of said terminal sets further comprises a connecting sensor used to tell said choosing means about which said terminal sets are connected and used to repeatedly choose said connected terminal sets.

20. The system of auto-configuration for instrument setting according to claim 19, further comprising a stopping switch for sending a stopping control signal to said first electrical instrument in accordance with said control signal source, wherein the choosing action will be stopped after said stopping control signal is received.

21. The system of auto-configuration for instrument setting according to claim 19, further comprising a configuration-storing means used to receive and store said chosen result of said chosen connected terminal set, and said configuration will be started at next connected one to said chosen connected terminal set when said auto-configuration for instrument setting is started next time.

22. The system of auto-configuration for instrument setting according to claim 11, wherein said first electrical instrument is a DVD/Video CD player and said second electrical instrument is a display apparatus.

23. A method of auto-configuration for a DVD/Video CD player, comprising:
   starting auto-configuration for instrument setting in said DVD/Video CD player having a plurality of input/output terminal sets, wherein said DVD/Video CD player is electrically connected to a display apparatus by means of at least one terminal set of said DVD/Video CD player;
   choosing one of said terminal sets every preset period of time and setting a corresponding configuration of said chosen terminal set repeatedly by the DVD/Video CD player, and then transmitting electrical signals originated from said DVD/Video CD player to said display apparatus through said chosen terminal set;
   displaying multimedia information on said display apparatus; and
   repeating the choosing step for another one of said terminal sets and the displaying step until a stopping control signal is sent.

24. The method of auto-configuration for a DVD/Video CD player according to claim 23, wherein said electrical signals comprise video signals, audio signals, control signals and information signals.

25. The method of auto-configuration for a DVD/Video CD player according to claim 23, wherein the choosing step is performed by non-repeatedly choosing said terminal sets one by one with a sequence.

26. The method of auto-configuration for a DVD/Video CD player according to claim 23, further comprising a step of automatically stopping auto-configuration for instrument setting to automatically stop after choosing said terminal sets at a preset number of times.

27. The method of auto-configuration for a DVD/Video CD player according to claim 26, further comprising a step of storing configuration setting after automatically stopping auto-configuration for instrument setting and said terminal set next to the one of said stored configuration setting will be chosen when said auto-configuration for instrument is started next time.

28. The method of auto-configuration for a DVD/Video CD player according to claim 23, further comprising a step of detecting connected terminal sets automatically for choosing said connected terminal sets only before the step of choosing one of said terminal sets.

29. The method of auto-configuration for a DVD/Video CD player according to claim 23, further comprising a step of playing multimedia information for said chosen terminal set.

30. A system of auto-configuration for instrument setting of a multimedia apparatus, comprising:
   at least one terminal set for electrically connecting said multimedia apparatus to a display apparatus, said multimedia apparatus having a plurality of input/output terminal sets;
   a choosing means located in the multimedia apparatus for repeatedly choosing one of said terminal sets every preset period of time after receiving a starting control signal; and
   a switching means located in the multimedia apparatus for setting a corresponding configuration of said chosen terminal set and transmitting electrical signals originated from said multimedia apparatus to said display apparatus through said chosen terminal set.

31. The system of auto-configuration for instrument setting according to claim 30, wherein the choosing action is performed by non-repeatedly choosing said terminal sets one by one with a sequence.

32. The system of auto-configuration for instrument setting according to claim 30, wherein said electrical signals comprise video signals, audio signals, control signals and information signals.

33. The system of auto-configuration for instrument setting according to claim 30, further comprising a stopping switch for sending a stopping control signal to said multimedia apparatus, wherein the choosing action will be stopped after said stopping control signal is received.

34. The system of auto-configuration for instrument setting according to claim 33, wherein said stopping control signal will be sent out after choosing said terminal sets at a preset number of times.

35. The system of auto-configuration for instrument setting according to claim 33, wherein said stopping control signal will be sent out after choosing each of said terminal sets at a preset number of times.

36. The system of auto-configuration for instrument setting according to claim 32, further comprising a configuration-storing means used to receive and store said chosen result of said chosen connected terminal set after said stopping control signal is received, and said configuration will be started at next connected one to said chosen connected terminal set when said auto-configuration for instrument setting is started next time.

37. The system of auto-configuration for instrument setting according to claim 30, wherein each of said terminal set further comprises a connecting sensor used to tell said choosing means about which said terminal sets are connected and used to repeatedly choose said connected terminal sets.

* * * * *